Patented Mar. 8, 1949

2,463,979

UNITED STATES PATENT OFFICE 2,463,979

PROCESS OF MAKING POROUS REFRACTORY ALUMINA MATERIAL

Kasimir Langrod, New Haven, Conn., assignor to Heany Industrial Ceramic Corporation, Rochester, N. Y., a corporation of New York No Drawing. Application March 26, 1945, Serial No. 585,006

5 Claims. (Cl. 106—40)

This invention relates to the manufacture of porous refractory material from alumina.

Alumina, as alpha corundum, has been found to have valuable uses as a refractory material in many chemical manufacturing steps and as an electrical insulator. The process steps heretofore employed, however, in preparing the finished material from the raw commercial alumina, have been measurably complex and expensive.

A primary object of the present invention, therefore, is to provide a simplified process of manufacturing refractory alumina bodies. An object also is to provide a process of the mentioned type which eliminates the use of acids and acid-proof equipment. An additional object is to provide a process which will permit a marked reduction in firing shrinkage. Still another object is the provision of a process which permits use of unmodified commercial alumina as a substantial part of the product.

Other objects will appear in connection with the following description of the preferred process of the invention.

Commercial calcined alumina, known in the trade as Grade A-1, is employed in the process. This grade contains impurities as follows: $Na_2$—0.60%, $SiO_2$—0.02%, $Fe_2O_3$—0.02% and $TiO_2$—0.005% and, as obtained, is calcined in a range of 900° C. to 1100° C.

A batch of this alumina is placed in a grinding machine, such as a ball mill of the type lined with flint and using flint pebbles, and ground for approximately eleven hours with an equal weight of water. At the end of this time the particle size has been reduced generally to a diameter of less than 44 microns or a size at which at least 95% by weight of the ground material passes through a 325 mesh to the inch screen.

The slurry derived from the ball mill is now mixed with unground Grade A-1 alumina in the proportion of four parts ground alumina to five parts unground alumina, having a mesh size of substantially over 200. This mixing is done in any conventional mixer, such as a paddle mixer, until the mix is substantially uniform, forming a paste of mud-like consistency of the right texture and stiffness for molding.

In molding, wooden frames may be used, preferably hinged. Under some conditions a temporary binder may be useful at this stage, and puddling to fill the mold completely.

After securing the mold the material is exposed to the open air for about two hours and is then subjected to slow drying in an oven. The body may be transferred bodily by hand to the oven or use may be made of a travelling belt. It is important that the drying be slow and uniform, a temperature of 150° C. being attained in over 50 hours or about 80 hours, followed by baking at this temperature for a lesser time or about 24 hours. Thermostat control is desirable, and with modern dryers with close control of relative humidity, air circulation and temperature, a faster drying schedule may be maintained.

Firing or sintering of the molded bodies is the next step, use being made preferably of a gas furnace and a temperature providing the desired porosity and at least slightly greater than that at which the material is to be used, or within a range of 1300° C. to 1850° C. The shrinkage is dependent on the firing temperature, the amount increasing directly as the temperature, amounting to 17.2% for a firing temperature of 1600° C. In cases where a firing temperature of over 1600° C. is used, I prefer to employ a modified process as described hereinbelow.

The product obtained by my process as above described, calcining in a range between 900° C. and 1100° C. and firing around 1600° C., has certain characteristic properties. It is porous, the porosity being about 34% of the volume. It has a specific gravity of 2.6. The particles of the ground and unground mix are approximately 99½% pure sintered alpha corundum alumina, and form a coherent bonded mass without additives. No noticeable liquid phase is apparent during firing below the melting point and hence no softening occurs in high temperature uses. The material forms an excellent electric insulator characterized by high resistivity at both low and high temperatures.

The process as hereinabove described employs Grade A-1 alumina without additional calcination, this process being useful where the firing temperature does not exceed 1600° C. In cases where a higher firing temperature is used it is desirable to modify the primary process in the following manner. Instead of using the same calcination for both ground and unground Grade A-1 alumina, the ground alumina is calcined between 900° C. and 1100° C. and the unground between 1200° C. and 1550° C. In other words, the modified process differs over the preferred process only in heating the natural Grade A-1 alumina to a temperature range of 1200° C. to 1550° C., the calcination range for the colloidal alumina remaining at 900° C. to 1100° C. The effect of this modification of the process is to reduce the shrinkage during the firing step materially, the shrinkage of a body consisting of 28% of ground alumina calcined at 1000° C. and 72% of unground alumina calcined at 1200° C. being unobservable at 1340° C., and at 1600° C. being only 6% as against 17.2% in the primary process.

In a second modification, 80% to 40% fused alumina may be substituted for the unground Grade A-1 alumina of the first modification, giving approximately identical shrinkage values as in the first modification. Impurities up to 4% may be permissible in the product of this modified process.

In connection with the described processes certain related matters are of interest.

The use of dilute hydrochloric acid to modify the consistency and plasticity of the material has been entirely eliminated, thus greatly reducing the time of treatment and the cost of equipment.

Only two batches of the material enter into the mixing. Moreover, the water content of the wet slurry and the relative amounts of wet slurry and dry material may be adjusted so as not to require addition or removal of liquid during the treatment, dispensing with filter pressing or evaporating. The elimination of siphoning and settling steps in the process is advantageous. The drying operation may be completed with the original batch, without the necessity of adding material to take up shrinkage.

While modifications one and two are described in connection with firing temperatures above 1600° C., these modifications give a satisfactory product for temperatures below 1600° C., the chief distinction being slightly greater cost than the primary process.

Molding or casting is referred to as a process step. However, for some uses, pressing may be employed, a hydraulic press and die at about six tons per square inch pressure being successfully used. Extrusion may also be accomplished with the addition of a temporary binder and plasticizer such as flour, dextrin or stearic acid.

The physical properties as given for the preferred example are, of course, subject to some change where the process steps are varied. The porosity is mentioned as 34% for a calcining temperature between 900° C. and 1100° C. and a firing temperature of around 1600° C. Obviously, this porosity may be varied with change in the firing temperature, or in the unground content of alumina, or with change in the calcination temperature of the unground alumina or by using fused alumina as one component. Values down to 20% or lower or 50% or higher may be obtained. Also, the specific gravity of the fired article will depend on the firing temperature and on the percentage of content and the density of the unground alumina. Values ranging between 1.8 and 2.7 are obtainable and this range may be extended.

While specific proportions of ground and unground alumina have been mentioned hereinabove, it is understood that these proportions may be varied considerably, ranges of 20% to 60% of ground alumina and 80% to 40% of unground alumina being found to be substantially inclusive.

Modifications apparent to those skilled in the art may of course be made, and hence no limitations are implied by the specific terminology employed except as are set forth in the claims hereunto appended.

What is claimed is:

1. A process of manufacturing articles having a volume porosity between 20% and 50% from raw alumina, calcined at a temperature between 900° C. and 1100° C., which comprises mixing 40% to 80% of the alumina with 60% to 20% of the alumina previously ground to a fineness in which 95% of the particles are less than 325 mesh, forming, drying the formed material by a slow heat rising to 150° C. during a time period of 50 to 80 hours, baking the material for 24 hours at said 150° C. temperature and firing at a temperature between 1300° C. and 1850° C.

2. A process of manufacturing articles having a volume porosity between 20% and 50% from raw alumina, calcined at a temperature between 900° C. and 1100° C., which comprises mixing 40% to 80% of the alumina with 60% to 20% of the alumina previously wet ground to a fineness substantially less than 200 mesh, forming, drying at a slow heat rising to 150° C. over a time period in excess of 50 hours where the temperature is maintained for a time interval of about 24 hours, and firing at a temperature between 1300° C. and 1850° C.

3. A process of manufacturing articles from raw alumina which comprises mixing 40% to 80% of the raw alumina, calcinated at temperatures within the range 900° C. to 1100° C., with 60% to 20% of the raw alumina calcined at temperatures within the range 1200° C. to 1550° C. and ground to a fineness substantially less than 200 mesh, forming, drying by slowly bringing the material up to a temperature of 150° C. over a time period of about 80 hours, baking the material for about 24 hours at said 150° C. temperature, and firing the material at temperatures between 1300° C. and 1850° C.

4. A process of manufacturing articles having a volume porosity between 20% and 50% from raw alumina calcined in a temperature range of 900° C. to 1100° C., which consists in mixing 40% to 80% of the raw calcined alumina with 60% to 20% of the raw calcined alumina ground to a particle size at which substantially 95% of the ground material passes through a 325 mesh to the inch screen, forming, slowly drying with a temperature rising to 150° C. in between 50 to 80 hours, baking the material at this 150° C. temperature for about 24 hours, and firing the material at a temperature range of 1300° C. to 1850° C.

5. A process of manufacturing articles from raw alumina which consists in calcining the raw alumina, mixing 40% to 80% of the calcined alumina with 60% to 20% of the calcined alumina ground to a particle size at which 95% by weight of the particles pass through a 325 to the inch mesh, forming, slowly drying to 150° C. over a time period of about 80 hours, baking at 150° C. over a time period of about 24 hours, and firing within a temperature range of 1300° C. to 1850° C.

KASIMIR LANGROD.

REFERENCES CITED

The following references are of record in the file of this patent:

UNITED STATES PATENTS

| Number | Name | Date |
| --- | --- | --- |
| 1,027,004 | Schwerin | May 21, 1912 |
| 1,050,303 | Schwerin | Jan. 14, 1913 |
| 1,107,012 | Allen | Aug. 11, 1914 |
| 1,350,825 | Meyerhofer | Aug. 24, 1920 |
| 1,802,296 | Willetts | Apr. 21, 1931 |
| 1,942,879 | Riddle | Jan. 9, 1934 |
| 2,030,200 | Gallup | Feb. 11, 1936 |
| 2,043,029 | Blair et al. | June 2, 1936 |
| 2,059,280 | Ruben | Nov. 3, 1936 |
| 2,369,709 | Baumann et al. | Feb. 20, 1945 |

FOREIGN PATENTS

| Number | Country | Date |
| --- | --- | --- |
| 43,925 | Austria | 1910 |

OTHER REFERENCES

Ser. No. 387,359, Klingler (A. P. C.), published May 11, 1943.